United States Patent
Kwon et al.

(10) Patent No.: US 9,171,378 B2
(45) Date of Patent: Oct. 27, 2015

(54) CAMERA APPARATUS AND METHOD FOR TRACKING OBJECT IN THE CAMERA APPARATUS

(71) Applicant: Samsung Electronics Co., Ltd., Gyeonggi-do (KR)

(72) Inventors: Jung-Tae Kwon, Gyeonggi-do (KR); Pyo-Jae Kim, Seoul (KR); Jin-Hee Na, Seoul (KR); Jae-Sik Sohn, Gyeonggi-do (KR); Young-Kwon Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 298 days.

(21) Appl. No.: 13/932,674

(22) Filed: Jul. 1, 2013

(65) Prior Publication Data

US 2014/0003661 A1 Jan. 2, 2014

(30) Foreign Application Priority Data

Jun. 29, 2012 (KR) .................. 10-2012-0071132

(51) Int. Cl.
*G06T 7/20* (2006.01)

(52) U.S. Cl.
CPC ............ *G06T 7/20* (2013.01); *G06T 7/2033* (2013.01); *G06T 2207/10016* (2013.01); *G06T 2207/30244* (2013.01)

(58) Field of Classification Search
CPC .......... G06T 7/20; G06T 7/2033; G06T 7/204; G01S 3/785; G01S 3/786; G01S 3/7864; H04N 5/144
See application file for complete search history.

(56) References Cited

U.S. PATENT DOCUMENTS

| | | | |
|---|---|---|---|
| 7,489,806 B2 | 2/2009 | Mohri et al. | 382/107 |
| 8,019,170 B2 | 9/2011 | Wang et al. | 382/239 |
| 2005/0275723 A1* | 12/2005 | Sablak et al. | 348/169 |
| 2015/0016680 A1* | 1/2015 | Mack et al. | 7/204 |

FOREIGN PATENT DOCUMENTS

JP 4007899 B2 9/2007 ............. G06F 3/033

* cited by examiner

*Primary Examiner* — Andrew W Johns
(74) *Attorney, Agent, or Firm* — The Farrell Law Firm, P.C.

(57) ABSTRACT

A camera apparatus capable of tracking a target object based on motion of a camera sensed by a motion sensor and a method for tracking an object in the camera apparatus are provided. The method includes, if input image data is inputted, sensing motion of a camera which captures the input image data, generating camera motion data corresponding to motion of the camera, estimating a pose or motion of the camera based on the camera motion data, and tracking translation of a target object based on at least one of the estimated pose or motion of the camera and the input image data.

18 Claims, 6 Drawing Sheets

CAMERA APPARATUS AND METHOD FOR TRACKING OBJECT IN THE CAMERA APPARATUS

PRIORITY

This application claims priority under 35 U.S.C. §119(a) to a Korean Patent Application filed in the Korean Intellectual Property Office on Jun. 29, 2012 and assigned Serial No. 10-2012-0071132, the contents of which are incorporated herein by reference.

BACKGROUND OF THE INVENTION

1. Field of the Invention

The present invention generally relates to a camera apparatus, and more particularly, to a camera apparatus capable of tracking a target object based on motion of a camera, sensed by a motion sensor, and a method for tracking an object in the camera apparatus.

2. Description of the Related Art

Vision-tracking has been conventionally performed by tracking a target object to be tracked in image data of every frame of an image input from a camera. However, if the number of target objects to be tracked in the input image increases, such vision-tracking may have to track a plurality of target objects simultaneously, significantly increasing the amount of computation for image processing. As such, conventional tracking has a difficulty in simultaneously tracking a plurality of objects due to an increase in the amount of computation.

Moreover, according to conventional tracking, if a target object a user wants to track is occluded by some obstacle in spite of being present in a Region of Interest (ROI) on the screen, the object cannot be recognized and thus cannot be tracked. Neither can a target object out of the ROI be tracked, based on conventional tracking.

SUMMARY OF THE INVENTION

Accordingly, the present invention provides a camera apparatus capable of tracking a target object based on motion of a camera, sensed by a motion sensor, and a method for tracking an object in the camera apparatus.

According to an aspect of the present invention, there is provided a method for tracking an object in a camera apparatus, the method including, if input image data is inputted, sensing motion of a camera which captures the input image data, generating camera motion data corresponding to motion of the camera, estimating a pose or motion of the camera based on the camera motion data, and tracking translation of a target object based on at least one of the estimated pose or motion of the camera and the input image data.

According to another aspect of the present invention, there is provided a camera apparatus including an imaging unit configured to receive an image and transform the image into input image data, an image processor configured to track a target object from the input image data, a motion sensor configured to sense motion of a camera which captures the input image data, and a motion processor configured to generate camera motion data according to the sensed motion of the camera, wherein the image processor comprises a motion tracker configured to estimate a pose and motion of the camera based on the camera motion data, and estimate translation of the target object based on the estimated pose and motion of the camera.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF EMBODIMENTS OF THE INVENTION

Hereinafter, embodiments of the present invention will be described in detail with reference to the accompanying drawings. In the following description, specific details such as detailed configuration and components are merely provided to assist the overall understanding of the embodiments of the present invention. Therefore, it should be apparent to those of ordinary skilled in the art that various changes and modifications of the embodiments described herein can be made without departing from the scope and spirit of the invention. A detailed description of known functions and configurations incorporated herein will be omitted when it may obscure the subject matter of the present invention.

Figure 1:
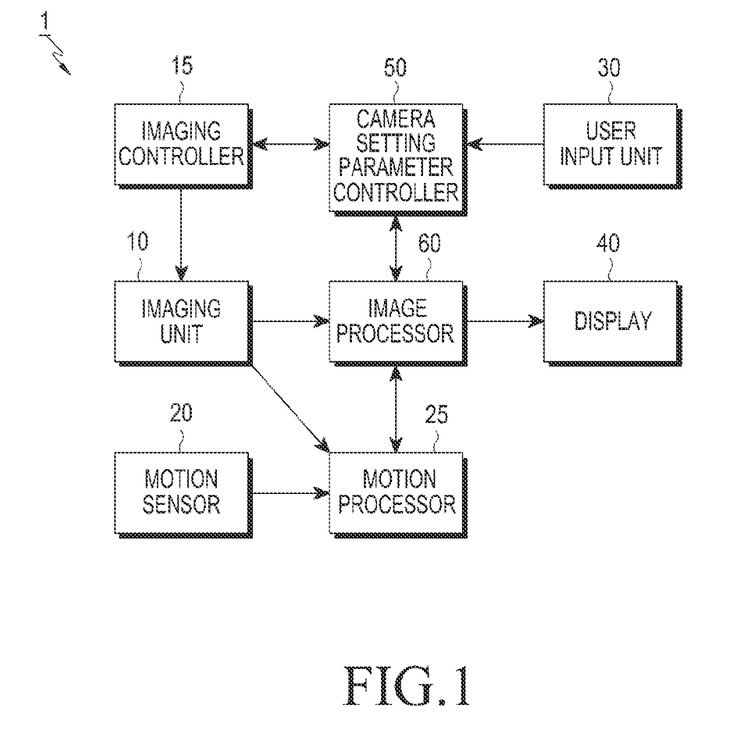
FIG. 1 illustrates a configuration of a camera apparatus according to an embodiment of the present invention.

FIG. 1 illustrates a camera apparatus according to an embodiment of the present invention.

Referring to FIG. 1, a camera apparatus 1 includes an imaging unit 10, an imaging controller 15, a camera-setting parameter controller 50, a user input unit 30, an image processor 60, a display 40, a motion sensor 20, and a motion processor 25.

The imaging unit 10 forms an optical image of an object photographed through a camera lens (not shown), that is, a subject, and converts the formed optical image into digital image data, which the proceeding will refer to as 'input image data'.

The imaging controller 15 adjusts such parameters as International Organization for Standardization (ISO), focus, and exposure time, of the imaging unit 10 according to a control signal input from the camera-setting parameter controller 50. These parameters are camera-setting parameters for setting a camera. The imaging controller 15 captures an input image by controlling the imaging unit 10 in such a manner that an image to which a camera-setting parameter is applied has, for example, an ISO of '400'. The imaging controller 15 may output a camera-setting parameter applied to the camera of the imaging unit 10 to the camera-setting parameter controller 50.

The motion sensor 20 includes one or more motion sensors such as an acceleration sensor, a gyroscope sensor, or a magnetic sensor, senses motion of the camera apparatus 1 to generate motion data, and transfers the generated motion data to the motion processor 25. The motion data includes at least one of translation acceleration, a translation direction, and an angle of the camera included in the imaging unit 10. The acceleration sensor is used to measure the translation acceleration or translation direction of the camera, the gyroscope sensor is used to measure an angular speed or rotation direction of the camera, and the magnetic sensor is used to measure an oriented direction of the camera.

The motion processor 25 processes, merges or coordinate-transforms the motion data received from the motion sensor 20 and the image data input from the imaging unit 10, such that the motion data and the image data can match each other. The motion processor 25 generates camera motion data regarding rotation or translation of the camera from at least one of the motion data and the image data during a transformation process.

The camera motion data output by the motion processor 25 is data representing rotation or translation of the camera, and indicates an angle, a pose, or a translation speed of the camera that captures an image.

The user input unit 30 may be implemented in the form of a keypad (not shown) which includes one or more manipulation buttons or a touch panel (not shown) to receive a user's input, and may output user input data input by the user to the camera-setting parameter controller 50. For example, the user may input a user input for capturing an image having ISO of '400' to the user input unit 30.

The display 40 displays preview image data received from the image processor 60. The display 40 may receive an image that is not processed by the image processor 60, that is, image data input from the imaging unit 10, and display the image data as the preview image data. For example, the display 40 may be implemented with a Liquid Crystal Display (LCD) or a touch screen.

The camera-setting parameter controller 50 receives a combination of some or at least one of current camera-setting parameters from the imaging controller 15, the preview image data input through the imaging unit 10 and output to the display 40, image recognition data by the image processor 60, and the user input data received through the user input unit 30. The camera-setting parameter controller 50 executes a combination of at least one or two of ISO, Auto Focus (AF), exposure, zoom, binning, sub-sampling, edge improvement, and noise reduction of the imaging unit 10 to determine camera-setting parameters to be applied to the camera included in the imaging unit 10.

The image processor 60 may recognize an object or estimate or track motion of the object based on the image data input through the imaging unit 10 and the camera motion data received from the motion processor 25. The image processor 60 may output an object recognition result with respect to a preview image input through the imaging unit 10 to the camera-setting parameter controller 50.

Figure 2:
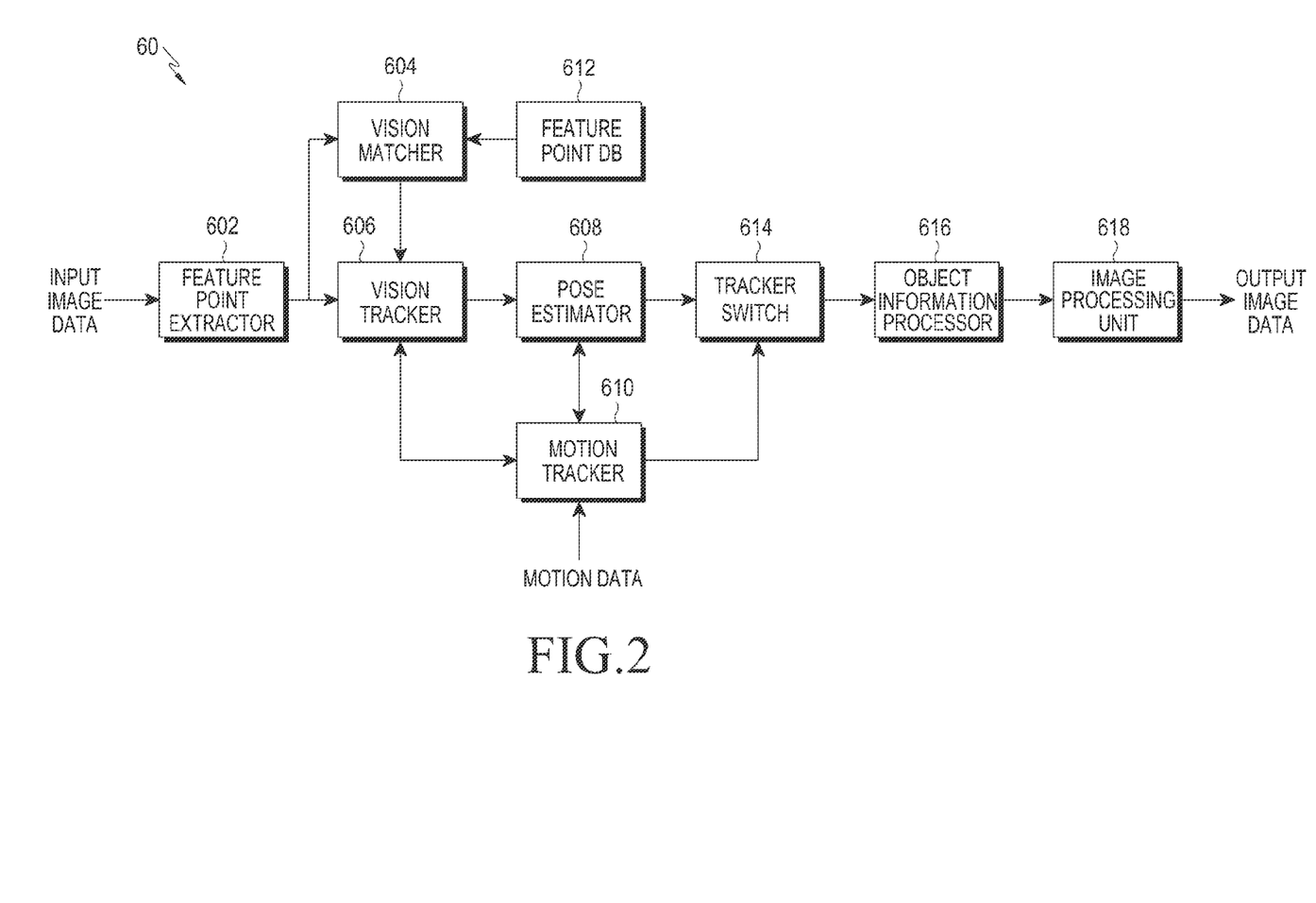
FIG. 2 illustrates a configuration of an image processor of a camera apparatus shown in FIG. 1.

FIG. 2 illustrates the image processor 60 of the camera apparatus 1 shown in FIG. 1.

Referring to FIG. 2, the image processor 60 includes a feature point extractor 602, a vision matcher 604, a vision tracker 606, a pose estimator 608, a motion tracker 610, a feature point Data Base (DB) 612, a tracker switch 614, an object information processor 616, and an image processing unit 618.

The feature point extractor 602 extracts feature points of an object to be tracked (hereinafter target object) based on input image data input through the imaging unit 10. The feature point extractor 602 according to an embodiment of present invention may extract feature points of the target object, in a current frame of the input image data input through the imaging unit 10.

The vision matcher 604 matches the feature points of the target object, extracted by the feature point extractor 602, with feature points corresponding to the target object, previously stored in the feature point DB 612. The vision matcher 604 extracts only feature points matched to the feature points previously stored in the feature point DB 612 from among the feature points extracted by the feature point extractor 602, and outputs matched feature points among extracted feature points as feature point data (hereinafter first feature point data) to the vision tracker 606. Matching between the feature points by the vision matcher 604 may be performed at preset frame intervals, which may be set according to setting previously stored in the feature point DB 612. The first feature point data includes position data regarding the matched feature points.

The vision tracker 606 compares a first feature point included in a previous frame with second feature points included in a current frame. The first feature point is of a target object in the previous frame, and the second feature points are of the target object extracted for the current frame by the feature point extractor 602. By comparing the first feature point with the second feature points, the vision tracker 606 can recognize feature point translation between the previous frame and the current frame. Among the second feature points, one matched to the first feature point will be referred to as a 'third feature point'. The vision tracker 606 stores feature point data regarding the translated feature point, that is, the third feature point (hereinafter third feature point data), and may update the third feature point data in subsequent frame processing. The third feature point may be used as the first feature point in processing of a next frame.

Feature point data stored by the vision tracker 606, that is, third feature data corresponding to each third feature point is output to the motion sensor tracker 610 and the pose estimator 608.

The motion tracker 610 transforms first position data corresponding to first feature points of the previous frame tracked by the vision tracker 606 into other positions on the previous frame, i.e., third feature points of the current frame, to update the first position data, based on camera motion data. That is, the motion tracker 610 predicts to which positions in the current frame the first feature points of the previous frame are translated, based on the camera motion data obtained by sensing camera's motion, thereby predicting a position of the target object in the current frame.

The motion tracker 610 forwards the position data regarding the third feature points to the vision tracker 606 or the pose estimator 608. Alternatively, the motion tracker 610 may translate position data and pose data of the target object, transmitted from the pose estimator 608, to other positions on the screen based on the camera motion data. That is, the motion tracker 610 may translate position data and pose data of the target object in the previous frame, determined by the pose estimator 608, to position data and pose data of the target object in the current frame based on the camera motion data output from the motion processor 25. The motion tracker 610 transmits position data and pose data corresponding to each of the translated third feature points to the tracker switch 614.

The pose estimator 608 combines position data corresponding to each of feature points input from the vision tracker 606 to calculate position data and pose data of the target object. The calculated position data and pose data of the target object may be transmitted to the tracker switch 614 and the motion tracker 610. As such, the position of the target object is estimated by the vision tracker 606 and the pose of the target object is estimated by the pose estimator 608, which is referred to as 'vision-tracking'.

If the vision tracker 606 cannot perform feature-point tracking, that is, vision-tracking, the pose estimator 608 may calculate position data and pose data of the target object based on position data corresponding to each feature point input from the motion tracker 610. The position data and pose data calculated by the pose estimator 608 are forwarded to the tracker switch 614.

As such, the motion tracker 610 estimates the third feature points of the target object in the current frame based on the camera motion data, and calculates the position data and pose data of the target object based on the position data corresponding to each of the third feature points, which is referred to as 'motion-tracking'.

When motion-tracking is performed, a process of extracting the second feature points in the current frame at the feature point extractor 602, matching the first feature point of the previous frame to the second feature points, and generating feature point data regarding the third feature points may be skipped. Therefore, when only motion-tracking is performed, the amount of computation in the camera apparatus 1 is reduced in comparison to when vision-tracking is performed.

The tracker switch 614 selects one of an output of the pose estimator 608, i.e., a vision-tracking result, and an output of the motion tracker 610, i.e., a motion-tracking result according to an order of a frame, and outputs the selected output to the object information processor 616. If the vision tracker 606 fails to track the target object, the tracker switch 614 selects the output of the motion tracker 610, that is, the motion-tracking result, and outputs the motion-tracking result to the object information processor 616.

The object information processor 616 determines a position and a pose of the target object in an input image based on the position data and pose data of the target object output from the tracker switch 614. The object information processor 616 may generate a target object identifier based on the determined position and pose of the target object.

The image processing unit 618 combines the target object identifier generated by the object information processor 618 with the image of the current frame, thus generating output image data, and outputs the generated output image data, such as preview image data.

According to another embodiment, the image processing unit 618 may receive information about the position and pose of the target object from the object information processor 616 and generate the target object identifier. The preview image data is displayed by the display 40 to allow the user to recognize the position of the target object. As the target object identifier is included in the preview image data, the user using the camera apparatus 1 may easily recognize the position of the target object through the target object identifier.

Figure 3:
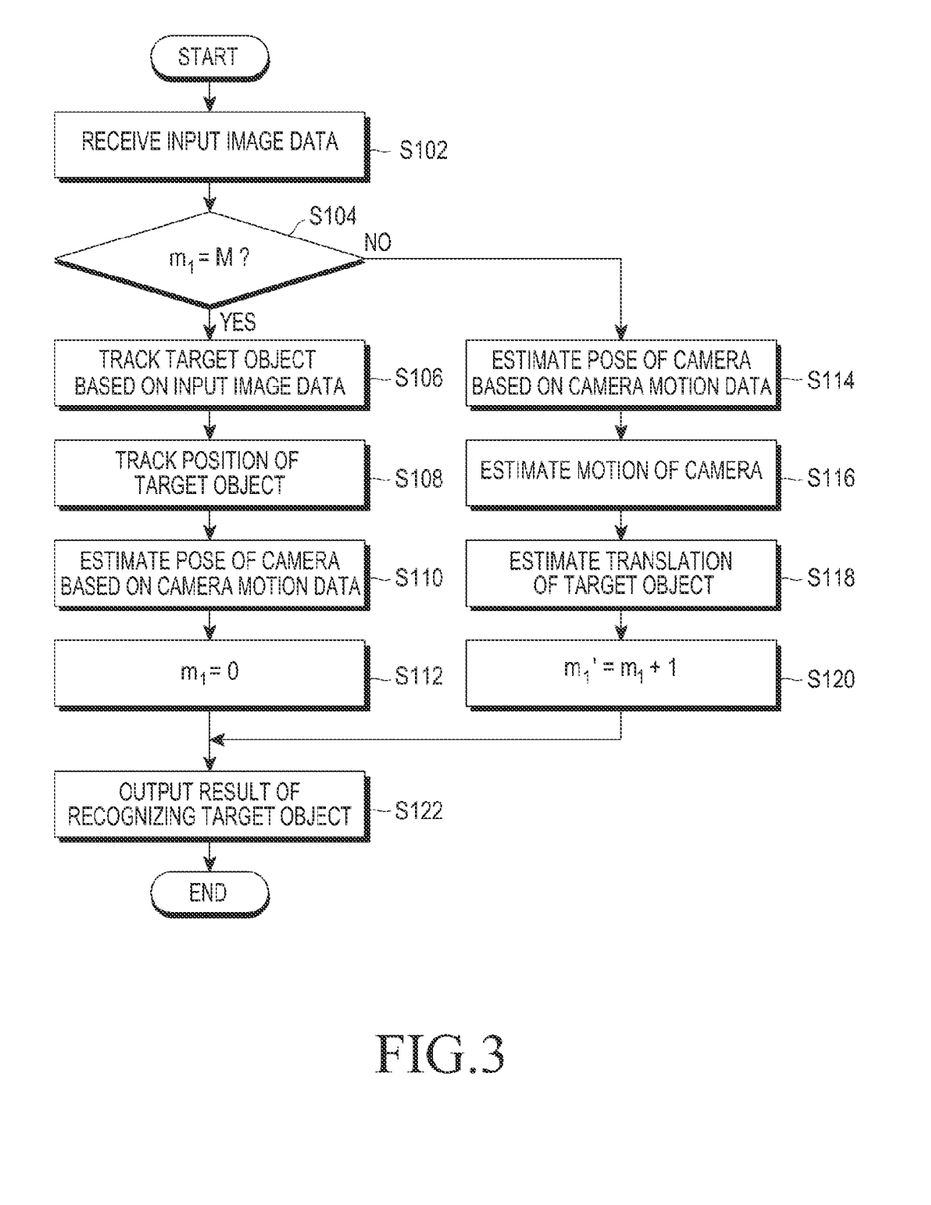
FIG. 3 illustrates a method for tracking an object in a camera apparatus shown in FIG. 1 according to a first embodiment of the present invention.

FIG. 3 illustrates a method for tracking an object in the camera apparatus 1 shown in FIG. 1 according to an embodiment of the present invention. The image processor 60 according to the current embodiment may alternately perform vision-tracking and motion-tracking during image processing. In FIG. 3, it is assumed that the image processor 60 performs one time of vision-tracking after M times of motion-tracking.

Referring to FIG. 3, the image processor 60 receives input image data from the imaging unit 10 in step S102. If the number of motion-tracking, $m_1$, is equal to M which is a natural number ('YES' in step S104), the image processor 60 has to perform vision-tracking with respect to the input image data input in step S102. To implement vision-tracking, the tracker switch 614 may select the output of the pose estimator 608 according to an order of a frame of the input image data in the current embodiment.

The image processor 60 tracks the target object based on the input image data in step S106 to estimate the position of the target object in step S108. A process of tracking the target object based on the input image data is performed in the following manner. The feature point extractor 602 extracts feature points of the target object based on the input image data, and the vision matcher 604 matches the feature points extracted by the feature point extractor 602 to the feature points previously stored in the feature point DB 612 and outputs feature point data. The vision tracker 606 recognizes translation of the feature points by comparing the first feature point included in the previous frame with the second feature points included in the current frame, and updates position data of the translated feature points, that is, the third feature points. The pose estimator 610 may calculate the position and pose of the target object based on the position data updated by the vision tracker 606.

Once the target object is estimated by the image processor 60, the image processor 60 estimates the pose of the camera based on the camera motion data output from the motion processor 25 in step S110. According to an embodiment, the pose data indicating the pose of the camera estimated by the image processor 60 may be stored in the camera apparatus 1.

Once the camera's pose is estimated, the image processor 60 initializes the number of motion-tracking, that is, $m_1$, to 0 in step S112. The image processor 60 outputs a result of recognition of the target object through the image processing unit 618 in step S122. The image processing unit 618 may display a processed image, such as preview image data processed to allow the user to easily recognize the target object, through the display 40.

If the number of motion-tracking, $m_1$, is not equal to M ('NO' in step S104), the image processor 60 has to perform motion-tracking with respect to the input image data input in step S102. The image processor 60 estimates the pose of the camera based on the camera motion data output from the motion processor 25 in step S114. The image processor 60 estimates the camera's motion based on the pose data of the camera estimated in step S110 and the pose data of the camera in the current frame in step S116. The camera motion data includes data regarding rotation or translation of the camera, which is tracked to enable recognition of rotation or translation of the target object. Even when the target object is fixed, if the camera is translated, the target object appears to be translated in an image captured by the imaging unit 10. Therefore, the image processor 60 according to the present invention may estimate a motion or pose of the target object based on the camera motion data.

As such, once the pose and motion of the camera are estimated, the image processor 60 estimates translation of the target object in step S118. When translation of the target object is estimated, the image processor 60 increases the number of motion-tracking, $m_1$, by 1 in step S120, to produce $m_1'$. The image processor 60 outputs a result of recognizing the target object by the image processing unit 618 in step S122.

Figure 4:
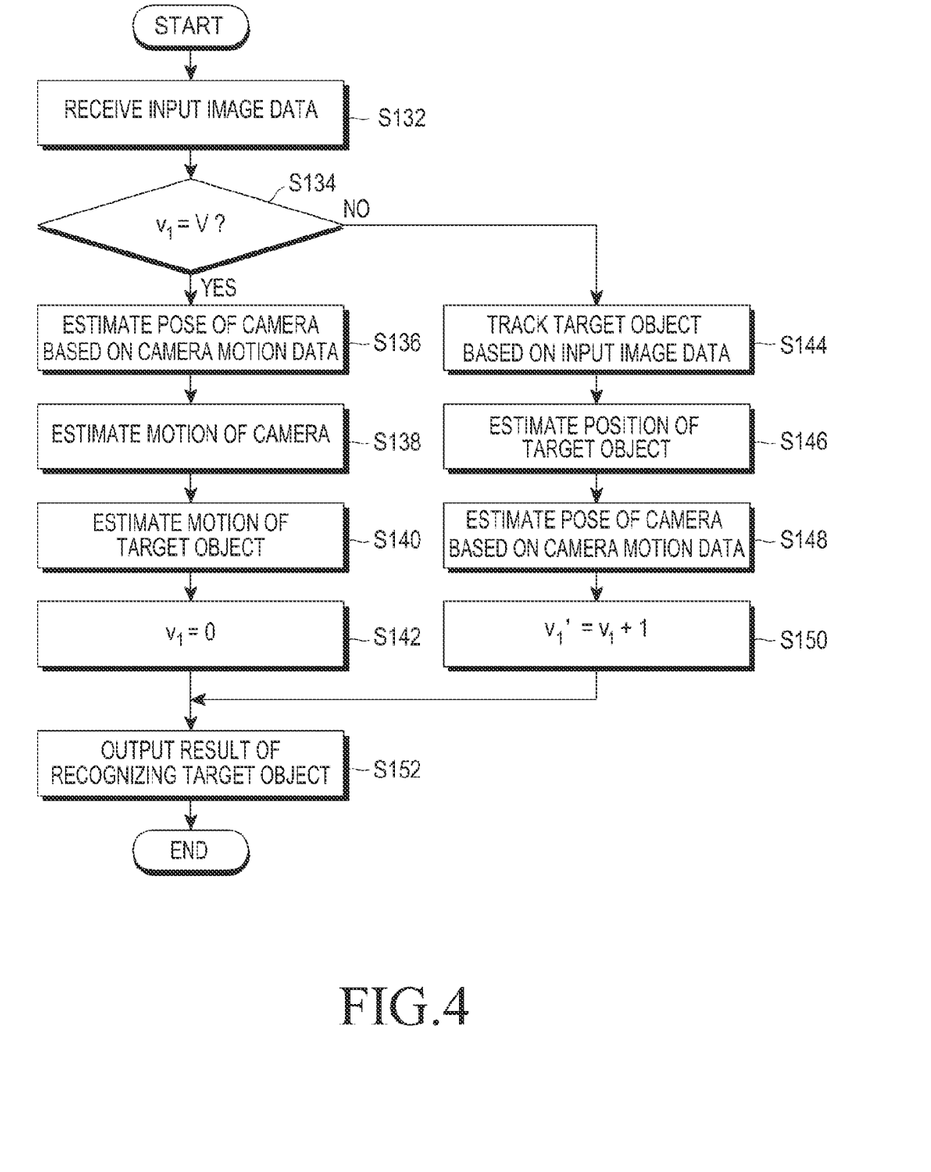
FIG. 4 illustrates a method for tracking an object in a camera apparatus shown in FIG. 1 according to a second embodiment of the present invention.

FIG. 4 illustrates a method for tracking an object in the camera apparatus 1 shown in FIG. 1 according to a second embodiment of the present invention. As in FIG. 3, the image processor 60 alternately performs vision-tracking and motion-tracking during image processing. In FIG. 4, it is assumed that the image processor 60 performs motion-tracking once after performing vision-tracking V times.

Referring to FIG. 4, the image processor 60 receives input image data from the imaging unit 10 in step S132. If the number of vision-tracking, $v_1$, is equal to V ('YES' in step S134), the image processor 60 has to perform motion-tracking with respect to the input image data input in step S132. To perform motion-tracking, the tracker switch 614 may select the output of the pose estimator 608 according to an order of a frame of the input image data in the current embodiment.

The image processor 60 estimates the pose of the camera based on the camera motion data output from the motion processor 25 in step S136. The image processor 60 also estimates the translation of the camera based on the camera motion data in step S138. By tracking back the rotation and translation of the camera based on the camera motion data, the rotation or translation of the target object in the input image data can be estimated.

Once the pose and motion of the camera are estimated, the image processor 60 estimates translation of the target object in step S140. The image processor 60 initializes the number of vision-tracking, $v_1$, to 0 in step S142. The image processor 60 outputs a result of recognition of the target object by the image processing unit 618 in step S152.

If the number of vision-tracking, $v_1$, is not equal to V ('NO' in step S134), the image processor 60 tracks the target object based on the input image data in step S144 to estimate the position of the target object in step S146. The target object is tracked based on the input image data in the following manner. The feature point extractor 602 extracts feature points of the target object based on the input image data, and the vision matcher 604 matches the feature points extracted by the feature point extractor 602 with the feature points previously stored in the feature point DB 612 to output feature point data. The vision tracker 606 compares a first feature point included in the previous frame with second feature points included in the current frame to recognize feature point translation, and updates position data regarding the translated feature points, that is, third feature points. The pose estimator 608 may calculate a position and a pose of the target object based on the position data updated by the vision tracker 606.

Upon estimation of the target object, the image processor 60 estimates the pose of the camera based on the camera motion data in step S148. The image processor 60 may store pose data indicating the pose of the camera estimated in step S148 in the camera apparatus 1. After the pose of the camera is estimated, the image processor 60 increases the number of vision-tracking, $v_1$, by 1 in step S150, to produce $v_1'$. In addition, the image processor 60 outputs a result of recognition of the target object by the image processing unit 618 in step S152. The image processing unit 618 may display a processed image, such as preview image data processed to allow the user to easily recognize the target object through the display 40.

Figure 5:
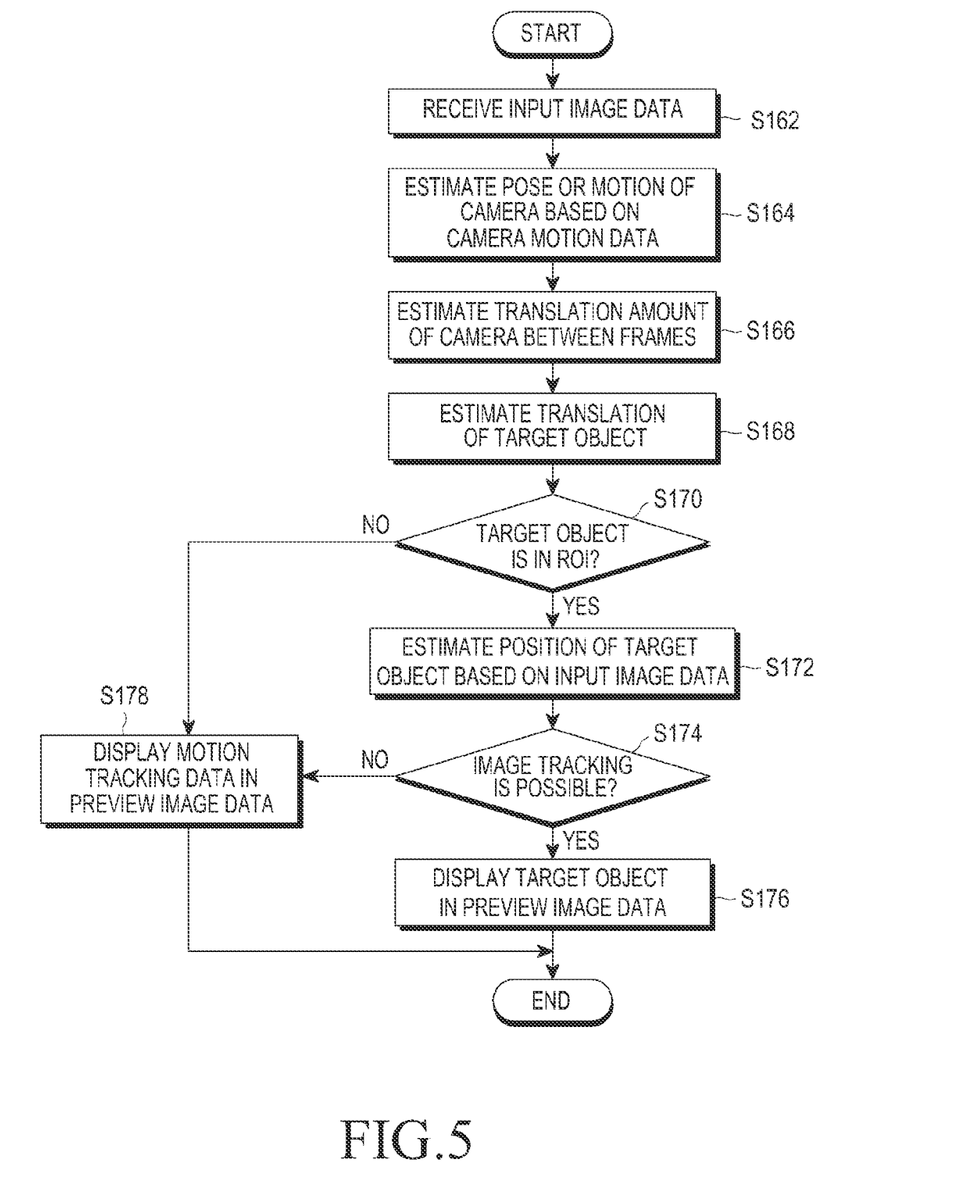
FIG. 5 illustrates a method for tracking an object in a camera apparatus shown in FIG. 1 according to a third embodiment of the present invention.

FIG. 5 illustrates a method for tracking an object in the camera apparatus 1 shown in FIG. 1 according to a third embodiment of the present invention.

Referring to FIG. 5, the image processor 60 receives input image data from the imaging unit 10 in step S162. The image processor 60 estimates a pose or motion of the camera included in the imaging unit 10 based on the camera motion data output through the motion processor 25 in step S164. The camera motion data indicates camera rotation or translation, which is used to enable recognition of rotation or translation of the target object. That is, based on the camera motion data, the position or pose of the target object can be estimated.

The image processor 60 estimates a translation amount of the camera between frames in the input image data in step S166, and estimates translation of the target object in step S168. The image processor 60 may estimate a translation direction and a translation pose of the target object, and a position in each frame according to translation of the target object in step S166. Upon estimation of translation of the target object, the position of the target object can also be estimated.

The image processor 60 determines in step S170 whether the target object is present in the ROI according to translation of the target object estimated in step S168. If it is determined in step S170 that the target object is in the ROI ('YES' in step S170), the image processor 60 determines in step S174 whether image tracking is possible. For example, if the target object is not included in the preview image data displayed through the display 40, the image processor 60 cannot estimate the position of the target object based on the input image data.

If it is determined in step S174 that image tracking is possible ('YES' in step S174), the target object is displayed in the preview image data displayed through the display 40 in step S176.

If it is determined in step S170 that the target object is not in the ROI ('NO' in step S170), the image processor 60 generates motion-tracking data. When it is determined in step S174 that image tracking is not possible ('NO' in step S174), the image processor 60 generates motion-tracking data, which the camera apparatus 1 incorporates and displays in the preview image data in step S178.

The motion-tracking data may be for indicating that the target object cannot be displayed in the preview image data if the target object is not in the ROI ('NO' in step S170), and may be for indicating that motion-tracking is being performed by the camera apparatus 1. For example, if the position of the target object is estimated such that the target object is positioned to the left of the ROI, the image processing unit 618 of the image processor 60 may process the input image data such that "<<" is displayed as the motion-tracking data, together with the preview image data, on a central portion to the left of the preview image data. The image processing unit 618 may synthesize the preview image data with, for example, motion-tracking data in the form of a text, saying "Target object is not present". Thus, the image processor 60 according to the current embodiment may indicate to the user that the target object is not present in the preview image data when the preview image data is displayed through the display 40.

If image tracking is not possible ('NO' in step S174), the image processing unit 618 of the image processor 60 may process the input image data such that the target object can be marked in the preview image data displayed through the display 40. The display 40 marks the target object in the preview image data when displaying the preview image data in step S178. For example, the image processing unit 618 outputs the preview image data on which an outline of the target object is expressed by a black, bold line to the display 40, which displays the preview image data including the outline.

Figure 6:
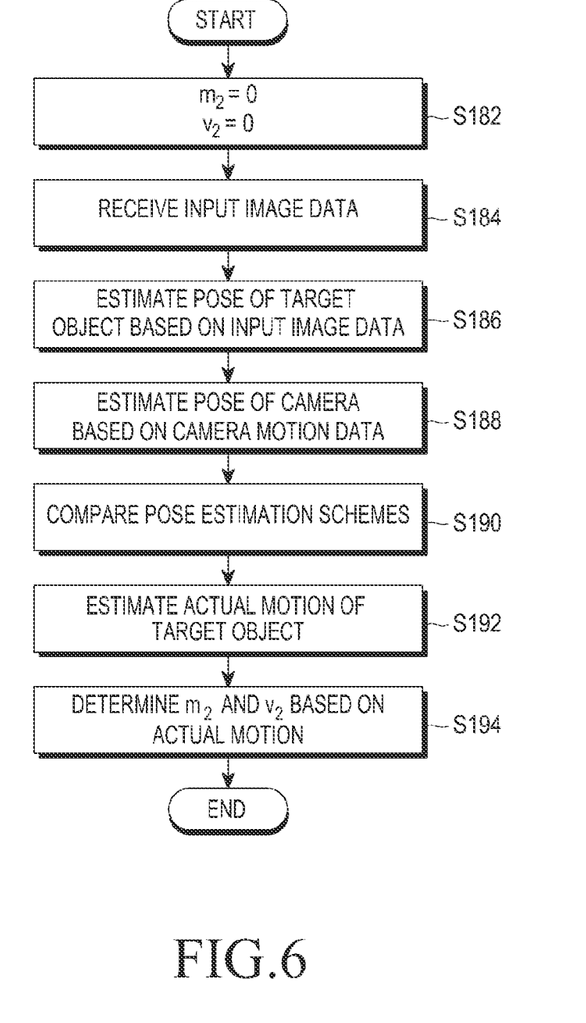
FIG. 6 illustrates a method for determining a ratio of motion-tracking and vision-tracking in an image processing unit shown in FIG. 2.

FIG. 6 illustrates a method for determining a ratio of motion-tracking and vision-tracking in the image processor 60 shown in FIG. 2. In FIG. 6, let the number of motion-tracking be $m_2$ and the number of vision-tracking be $v_2$.

Referring to FIG. 6, when the number of motion-tracking, '$m_2$', and the number of vision-tracking, '$v_2$', are initialized in step S182, the image processor 60 receives the input image data in step S184. The image processor 60 estimates a pose of the target object based on the input image data in step S186.

The image processor 60 also estimates the pose of the camera based on the camera motion data output from the motion processor 25 in step S188.

In step S190, the image processor 60 compares a pose estimation scheme for the target object used in step S186 with a pose estimation scheme for the target object used in step S188. That is, the image processor 60 performs vision-tracking in step S186 to estimate the pose of the target object, and performs motion-tracking in step S188 to estimate the pose of the target object.

By performing vision-tracking of step S186 and motion-tracking of step S188, the image processor 60 estimates actual motion of the target object in step S192. The image processor 60 preferably estimates actual motion of the target object more accurately by repeating vision-tracking of step S186 and motion-tracking of step S188 twice.

Once the actual motion of the target object is estimated, the image processor 60 determines the number of motion-tracking, $m_2$ (=M), and the number of vision-tracking, $v_2$ (=V), based on the actual motion of the target object in step S194.

The process according to an embodiment described with reference to FIG. 6 is preferably performed continuously even during execution of motion-tracking, such that the camera apparatus 1 adaptively changes or updates '$m_2$' and '$v_2$', taking the actual motion change of the target object into account.

The image processor 60 may increase the number of motion-tracking, $m_2$, greater than the number of vision-tracking, $v_2$, if the motion of the target object is small. For example, image processor 60 may determine that the motion of target object is small if motion of target object is formed within a predetermined range of the target object. If the motion of the target object is small, since an error between the motion of the target object estimated using the camera's motion and the actual motion of the target object is small, it is desirable to estimate the position of the target object by performing motion-tracking, thereby reducing a computational time necessary for estimation of the target object's motion.

If the motion of the target object is large, the number of vision-tracking, $v_2$, may be increased greater than the number of motion-tracking, $m_2$. For example, image processor 60 may determine that the motion of target object is large if motion of target object is formed beside a predetermined range of the target object. If the motion of the target object is large, because an error between the target object's motion estimated using the camera's motion and the actual motion of the target object is large, it is desirable to continuously estimate the position of the target object without missing the target object by performing vision-tracking.

The number of vision-tracking and the number of motion-tracking may be adjusted according to a utilization purpose of those of ordinary skill in the art. The image processor 60 may estimate the target object's motion by performing more iterations of vision-tracking than motion-tracking for a small motion of the target object, and performing more iterations of motion-tracking than vision-tracking for a large motion of the target object.

Alternatively, the image processor 60 may transform position data including a position of the target object in the previous frame and a position of the target object in the current frame by using interpolation or a filter previously included in the camera apparatus 1 to generate a target object identifier, and may include the generated target object identifier in the preview image data. The display 40 may display the preview image data including the generated target object identifier.

The present invention provides a camera apparatus and a method for tracking an object in the camera apparatus, by which the target object can be tracked based on camera's motion sensed by the motion sensor.

In addition, according to the present invention, vision-tracking is not performed such that the number of computation is reduced in comparison to when vision-tracking is performed, thereby facilitating continuous tracking of the target object. Even when the target object is occluded by another object or the target object is not present in an ROI, the target object can be continuously tracked, enhancing user convenience.

While the present invention has been particularly shown and described with reference to embodiments thereof, it will be understood by those of ordinary skill in the art that various embodiments or modifications may be made therein without departing from the spirit and scope of the present invention as defined by the following claims. Accordingly, the scope of the present invention should be defined by the claims and equivalents thereof rather than by the described embodiments.

What is claimed is:

1. A method for tracking an object in a camera apparatus, the method comprising:
   if input image data is inputted, sensing motion of a camera which captures the input image data;
   generating camera motion data corresponding to motion of the camera;
   estimating a pose or motion of the camera based on the camera motion data; and
   tracking translation of a target object based on at least one of the estimated pose or motion of the camera and the input image data.

2. The method of claim 1, before tracking the translation of the target object, further comprising:
   performing a first tracking process of tracking the translation of the target object based on the input image data; and
   performing a second tracking process of tracking the translation of the target object based on the estimated pose or motion of the camera,
   wherein the tracking the translation of the target object comprises selecting one of the first tracking process and the second tracking process to track the translation of the target object.

3. The method of claim 1, further comprising:
   incorporating and displaying a target object identifier indicating a position to which the target object is translated, in preview image data which is a result of outputting the input image data.

4. The method of claim 3, further comprising:
   determining whether the target object is present in a Region Of Interest (ROI), based on a result of tracking the translation of the target object based on the pose or motion of the camera.

5. The method of claim 4, further comprising:
   if the target object is present in the ROI, incorporating and displaying the target object identifier indicating a position to which the target object is translated, in the preview image data.

6. The method of claim 4, further comprising:
   when the tracking of the target object based on the input image data is not possible even if the target object is present in the ROI, tracking the position of the target object based on the motion or pose of the camera.

7. The method of claim 4, further comprising:
   if the target object is not present in the ROI, indicating that the target object is not present in the ROI by using the preview image data.

8. The method of claim 1, before tracking the translation of the target object, further comprising:
- performing a first tracking process of tracking the translation of the target object based on the input image data;
- performing a second tracking process of tracking the translation of the target object based on the estimated pose or motion of the camera;
- comparing a result of the first tracking process with a result of the second tracking process to estimate actual motion of the target object; and
- determining a ratio of selecting the result of the first tracking process to the result of the second tracking process based on the estimated actual motion.

9. The method of claim 8, further comprising:
- transforming position data comprising a position of the target object in a previous frame and a position of the target object in a current frame by using interpolation or a filter to generate a target object identifier; and
- incorporating and displaying the target object identifier in preview image data.

10. A camera apparatus comprising:
- an imaging unit configured to receive an image and transform the input image into input image data;
- an image processor configured to track a target object from the input image data;
- a motion sensor configured to sense motion of a camera which captures the input image data; and
- a motion processor configured to generate camera motion data according to the sensed motion of the camera,
- wherein the image processor comprises a motion tracker configured to estimate a pose and motion of the camera based on the camera motion data, and estimate translation of the target object based on the estimated pose and motion of the camera.

11. The camera apparatus of claim 10, wherein the image processor tracks translation of the target object through at least one of a first tracking operation of tracking the translation of the target object based on the input image data and a second tracking operation of tracking the translation of the target object based on the estimated pose or motion of the camera.

12. The camera apparatus of claim 10, wherein the image processor incorporates a target object identifier indicating a position to which the target object is translated, in preview image data that is a result of outputting the input image data.

13. The camera apparatus of claim 12, wherein the image processor determines whether the target object is in a Region Of Interest (ROI), based on a result of tracking the translation of the target object based on the pose or motion of the camera.

14. The camera apparatus of claim 13, wherein the image processor incorporates the target object identifier indicating a position to which the target object is translated, in preview image data that is a result of tracking the target object, if the target object is present in the ROI.

15. The camera apparatus of claim 13, wherein the image processor tracks the position of the target object based on the motion or pose of the camera, when tracking of the target object based on the input image data is not possible even if the target object is present in the ROI.

16. The camera apparatus of claim 13, further comprising a display configured to display the preview image data,
- wherein the image processor controls the display to indicate that the target object is not present in the ROI by using the preview image data, if the target object is not present in the ROI.

17. The camera apparatus of claim 10, wherein the image processor performs a first tracking operation of tracking the translation of the target object based on the input image data and a second tracking operation of tracking the translation of the target object based on the estimated pose or motion of the camera, compares a result of the first tracking process with a result of the second tracking process to estimate actual motion of the target object, and determines a ratio of selecting the result of the first tracking process to the result of the second tracking process based on the estimated actual motion.

18. The camera apparatus of claim 17, wherein the image processor transforms position data comprising a position of the target object in a previous frame and a position of the target object in a current frame by using interpolation or a filter to generate a target object identifier, and incorporates the generated target object identifier in preview image data.

* * * * *